(12) United States Patent
Po

(10) Patent No.: US 6,917,742 B2
(45) Date of Patent: Jul. 12, 2005

(54) OPTICAL FIBER

(75) Inventor: Hong Po, Sherborn, MA (US)

(73) Assignee: OCG Technology Licensing, LLC, Columbia, MD (US)

( * ) Notice: Subject to any disclaimer, the term of this patent is extended or adjusted under 35 U.S.C. 154(b) by 0 days.

(21) Appl. No.: 10/755,749

(22) Filed: Jan. 12, 2004

(65) Prior Publication Data
US 2004/0208464 A1 Oct. 21, 2004

Related U.S. Application Data

(63) Continuation of application No. PCT/US02/21803, filed on Jul. 10, 2002.
(60) Provisional application No. 60/304,882, filed on Jul. 12, 2001.

(51) Int. Cl.$^7$ .............................................. G02B 6/20
(52) U.S. Cl. ..................................... 385/125; 385/123
(58) Field of Search ................................ 385/123–128

(56) References Cited

U.S. PATENT DOCUMENTS

| | | | |
|---|---|---|---|
| 3,535,017 A | 10/1970 | Miller et al. | |
| 3,712,705 A | 1/1973 | Marcatili | |
| 3,808,549 A | 4/1974 | Maurer | |
| 3,901,674 A | 8/1975 | Strack et al. | |
| 3,902,879 A | 9/1975 | Siegmund | |
| 3,920,312 A | 11/1975 | Siegmund | |
| 4,127,398 A | 11/1978 | Singer, Jr. | |
| 4,354,736 A | 10/1982 | Maklad et al. | |
| 4,551,162 A | 11/1985 | Hicks, Jr. | |
| 4,630,889 A * | 12/1986 | Hicks, Jr. | 385/123 |
| 4,688,892 A | 8/1987 | Laakmann | |
| 4,815,079 A | 3/1989 | Snitzer et al. | |
| 5,121,460 A | 6/1992 | Tumminelli et al. | |
| 5,259,059 A * | 11/1993 | Abramov | 385/123 |
| 5,307,436 A * | 4/1994 | Berkey | 385/123 |
| 5,309,540 A | 5/1994 | Turpin et al. | |
| 5,418,880 A | 5/1995 | Lewis et al. | |
| 5,533,163 A | 7/1996 | Muendel | |
| 5,615,295 A | 3/1997 | Yoshida et al. | |
| 5,627,921 A | 5/1997 | Lidgard et al. | |
| 5,756,209 A | 5/1998 | Hale | |
| 5,822,489 A | 10/1998 | Hale | |
| 5,864,645 A | 1/1999 | Zellmer et al. | |
| 5,907,652 A | 5/1999 | DiGiovanni et al. | |
| 5,949,941 A | 9/1999 | DiGiovanni | |
| 5,966,491 A | 10/1999 | DiGiovanni | |
| 6,031,850 A | 2/2000 | Cheo | |
| 6,097,870 A | 8/2000 | Ranka et al. | |
| 6,101,199 A | 8/2000 | Wang et al. | |
| 6,115,526 A | 9/2000 | Morse | |
| 6,157,763 A | 12/2000 | Grubb et al. | |
| 6,345,141 B1 | 2/2002 | Grubb et al. | |
| 6,411,762 B1 | 6/2002 | Anthon et al. | |
| 6,415,079 B1 | 7/2002 | Burdge et al. | |
| 6,445,862 B1 | 9/2002 | Fajardo et al. | |
| 6,477,307 B1 | 11/2002 | Tankala et al. | |
| 6,480,659 B1 | 11/2002 | Patlakh et al. | |
| 6,483,973 B1 | 11/2002 | Mazzarese et al. | |
| 6,512,867 B2 * | 1/2003 | Brosnan | 385/27 |
| 6,625,363 B2 | 9/2003 | Carter et al. | |
| 6,625,364 B2 | 9/2003 | Johnson et al. | |
| 2002/0197039 A1 | 12/2002 | Carter et al. | |
| 2003/0165313 A1 | 9/2003 | Broeng et al. | |
| 2003/0174984 A1 | 9/2003 | Chiang et al. | |

* cited by examiner

Primary Examiner—Juliana Kang
(74) Attorney, Agent, or Firm—Peter J. Rainville; Sean P. Daley; Fish and Richardson P.C.

(57) ABSTRACT

In one aspect, the invention relates to optical fibers and systems that include such fibers. In another aspect, the invention provides an optical fiber that includes a core, a cladding surrounding the core, a layer surrounding the cladding, and a region between the layer and the cladding. The region can comprise an index of refraction that is different than an index of refraction comprised by the cladding. In one embodiment, the region can include a void containing air or a liquid. The void can be evacuated. The region can include a solid, such as, for example, a polymer. The layer can contact the cladding. The fiber can comprise rare earth ions.

15 Claims, 9 Drawing Sheets

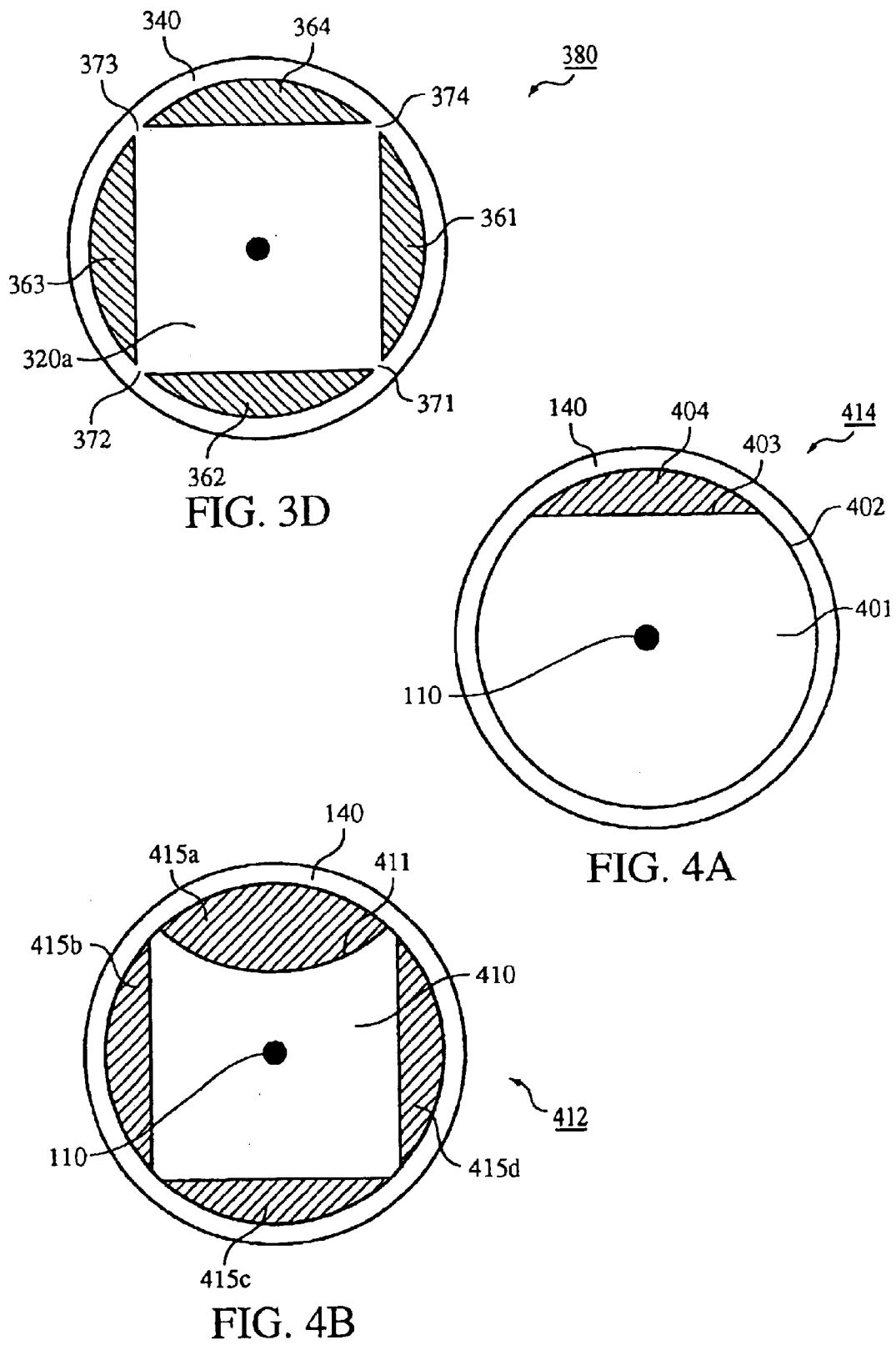

OPTICAL FIBER

CROSS-REFERENCE TO RELATED APPLICATION

This application is a continuation of International Application No. PCT/US02/21803, which has an international filing date of Jul. 10, 2002, and is entitled "Optical Fiber", and which in turn claims priority to U.S. Provisional Patent Application Ser. No. 60/304,882, which was filed Jul. 12, 2001 and is also entitled "Optical Fiber". The foregoing applications are incorporated herein by reference.

TECHNICAL FIELD

This invention relates to optical fibers, and systems containing optical fibers.

BACKGROUND

Optical fibers can be used to transport and/or enhance signals at certain wavelengths. For example, pump energy at a wavelength $\lambda_p$ can be emitted by an energy source, such as a laser, and coupled into an optical fiber having a core containing an active material that interacts with the pump energy, and undergoes certain electronic transitions to form energy at a different wavelength $\lambda_{out}$. The optical fiber can include, for example, a pair of reflectors that form a lasing cavity at the wavelength $\lambda_{out}$ so that the optical fiber can be used as a laser that converts energy at $\lambda_p$ to energy at $\lambda_{out}$.

SUMMARY

The invention generally relates to optical fibers and systems containing optical fibers.

In one aspect, the invention features an optical fiber that includes a core, a cladding contacting the core, and a region disposed in the cladding. The region has an index of refraction that is different than an index of refraction of the cladding.

In another aspect, the invention features an optical fiber that includes a core, a cladding contacting the core, a layer surrounding and contacting the cladding, and a region between the cladding and the layer. The index of refraction of the region is different than an index of refraction of the cladding.

In a further aspect, the invention features an optical fiber that includes a core, a cladding contacting the core, and a layer surrounding and contacting the cladding. The index of refraction of the layer is greater than an index of refraction of the cladding.

In one aspect, the invention features an optical fiber that includes a core, a cladding contacting the core, and a layer surrounding the cladding. The cladding is formed of a material capable of allowing energy at a desired wavelength to propagate therealong. The cladding and the layer define a void having a maximum dimension that is equal to or greater than the desired wavelength (e.g., at least twice the desired wavelength, at least five times the desired wavelength, at least 10 times the desired wavelength, at least 20 times the desired wavelength, at least 50 times the desired wavelength, at least 75 times the desired wavelength, at least 100 times the desired wavelength).

In another aspect, the invention features an optical fiber that includes a core, a cladding contacting the core, and a layer surrounding and contacting the cladding. The cladding and the layer define a void having a maximum dimension that is at least about one micron (e.g., at least about two microns, at least about five microns, at least about 10 microns, at least about 20 microns, at least about 50 microns, at least about 75 microns, at least about 100 microns).

In a further aspect, the invention features an optical fiber that includes a core and a cladding contacting the core. The cladding is formed of a material capable of allowing energy at a desired wavelength to propagate therealong. The cladding contains a void with a maximum dimension that is equal to or greater than a desired wavelength of propagation along the cladding.

In one aspect, the invention features, an optical fiber that includes a core and a cladding contacting the core. The cladding contains a void with a maximum dimension that is at least about one micron.

In another aspect, the invention features an optical fiber that includes a core, a cladding surrounding the core, and a first layer surrounding the cladding. The cladding has a substantially non-circular shape. The cladding and the first layer define a region between the cladding and the first layer. The region has an index of refraction that is different from the index of refraction of the cladding, and the region has an index of refraction that is different from an index of refraction of the first layer.

In a further aspect, the invention features an optical fiber that includes a core, a cladding surrounding the core, and a first layer surrounding the cladding. The cladding has a substantially non-circular shape, and the cladding and the first layer define a region between the cladding and the first layer that has an index of refraction that is less than an index of refraction of the cladding.

In a further aspect, the invention features an optical fiber that includes a core, a cladding surrounding the core, and a first layer surrounding the cladding. The cladding has a substantially non-circular shape, and the cladding and the first layer define a region between the cladding and the first layer that has an index of refraction that is less than an index of refraction of the first layer.

Embodiments of optical fibers can include one or more of the following features.

The region can have an index of refraction that is less than the index of refraction on of the cladding. The region can be formed of air.

The optical fiber can further include a layer surrounding the cladding. The index of refraction of the layer can be less than, greater than, or about the same as the index of refraction of the cladding. The layer can contact the cladding.

The core can be formed of an active material. The core can also include an additional material. The additional material can be a silica material.

The cladding can be formed of a silica material. The cladding can be formed of a material selected so that energy at a desired wavelength can propagate along the cladding.

The optical fiber can include a layer surrounding the cladding so that the region is between the cladding and the layer.

The region can be formed of a plurality of regions. The region can have a maximum dimension that is at least about two microns. The region can have a substantially non-circular cross-section.

The cladding can have a substantially square cross-section.

The optical fiber can further include a reflector configured to at least partially reflecting energy impinging thereon at a pump wavelength.

The optical fiber can further include a pair of reflectors with each of the pair of reflectors being configured to at least partially reflect energy impinging thereon at an output wavelength.

The optical fiber can have a numerical aperture of at least about 0.25 (e.g., at least about 0.3, at least about 0.35, at least about 0.4, at least about 0.5, at least about 0.6, at least about 0.7, at least about 0.8, at least about 0.9, about one).

The optical fiber can be included in a system with an energy source (e.g., a laser, such as a semiconductor diode laser) configured so that energy output by the energy source at the pump wavelength can be coupled into the optical fiber. The system can further include a Raman fiber laser configured so that energy output by the optical fiber at the output wavelength can be coupled into the Raman fiber laser. The system can further include an output cascade configured so that energy output by the Raman fiber laser can be coupled into the output cascade. The output cascade and the Raman fiber laser can be an integral unit.

In certain embodiments, the invention provides an optical fiber that has a cladding that does not have disposed thereon a lower refractive index layer.

In some embodiments, the invention provides an optical fiber that includes a cladding in contact with one or more regions having a lower refractive index than the cladding. In certain embodiments, one or more of the regions can be voids. A "void" as used herein, refers to a region within an optical fiber that is formed of one or more gases (e.g., air) or that is substantially evacuated.

In certain embodiments, the invention provides an optical fiber that includes a cladding having in contact therewith (e.g., fused therewith) a layer having a refractive index that is the same or higher than the refractive index of the cladding. For example, the layer can be formed of the same material as the cladding. The layer can, for example, enhance the mechanical integrity of the optical fiber, provide chemical protection for the cladding, and/or provide physical protection for the cladding.

In some embodiments, the invention can provide an optical fiber that can undergo three-level lasing with relatively high efficiency. For example, in certain embodiments, three-level lasing can be used to convert more than about 50% (e.g., more than about 60%, more than about 65%, more than about 70%, more than about 75%, more than about 80%, more than about 85%, more than about 90%, more than about 95%) of energy in an optical fiber (e.g., at a pump wavelength) to energy at a desired output wavelength (e.g., about 980 nanometers). As another example, in some embodiments, three-level lasing can be used to provide at least about 0.2 Watt (e.g., at least about 0.3 Watt, at least about 0.4 Watt, at least about 0.5 Watt, at least about 0.6 Watt, at least about 0.7 Watt, at least about 0.8 Watt, at least about 0.9 Watt, at least about 1 Watt, at least about 1.5 Watt, at least about 2 Watts, greater than about 2 Watts) of energy at about 980 nanometers.

DESCRIPTION OF THE DRAWINGS

FIGS. 3A–3D show an embodiment of making an embodiment of an optical fiber;

FIGS. 4A–4D show cross-sectional views of embodiments of optical fibers;

Features, objects and advantages of the invention are in the description, drawings and claims.

DETAILED DESCRIPTION

Figure 1A:
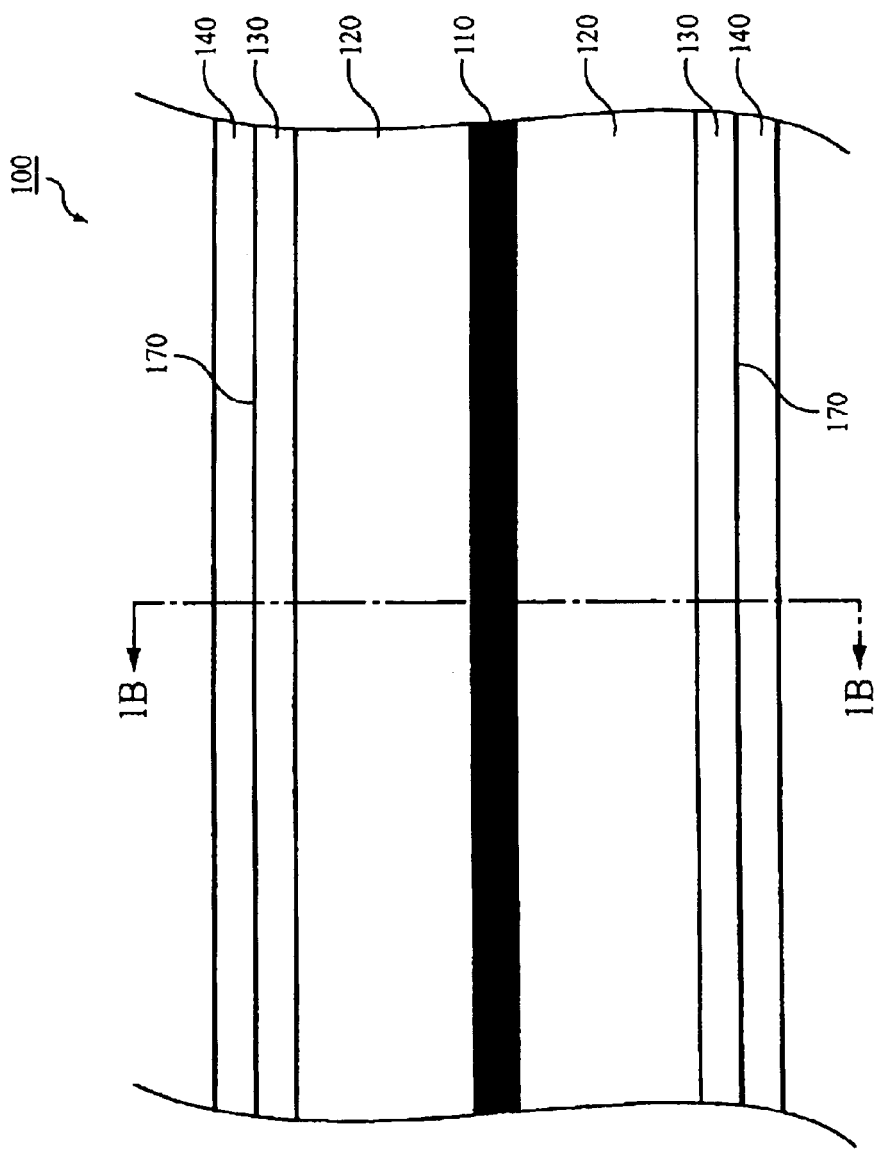
FIGS. 1A and 1B are cross-sectional views of an embodiment of an optical fiber.
Figure 1B:
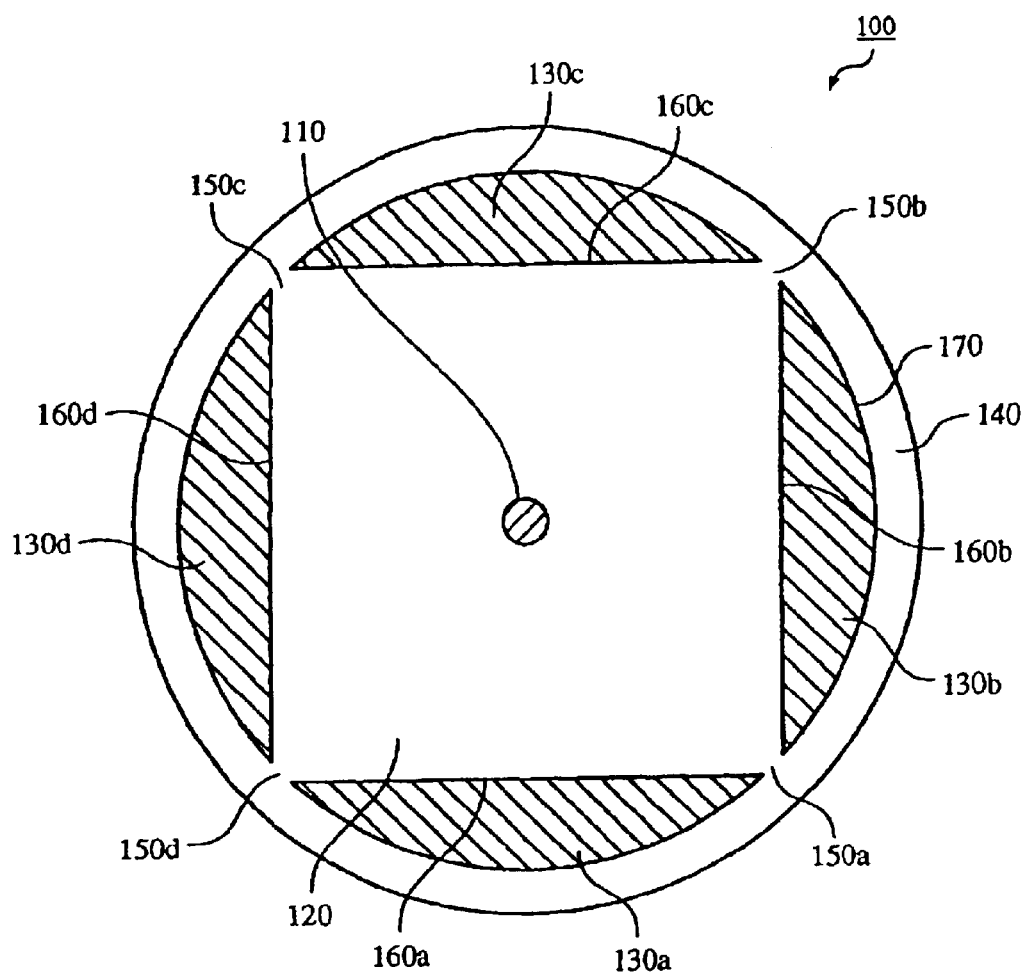

FIGS. 1A and 1B are cross-sectional views of an optical fiber 100 of the invention. Optical fiber 100 has a core 110 (e.g., a single mode core), a cladding 120, and an exterior layer 140 that surrounds and contacts cladding 120. Cladding 120 has sides 160a, 160b, 160c and 160d that form vertices 150a, 150b, 150c, and 150d. Vertices 150a–150d are fused to an inner surface 170 of layer 140. Optical fiber 100 additionally includes regions 130a, 130b, 130c, and 130d between portions of cladding 120 and layer 140.

Generally, core 110 is provided to enhance pump energy absorption (e.g., to produce gain) by interacting with pump energy and/or to guide energy at a desired wavelength ($\lambda_{out}$) In certain embodiments, core 110 includes a first material (e.g., a silica material, such as fused silica) and at least one dopant (e.g., at least one rare earth ion, such as erbium ions, ytterbium ions, neodymium ions, holmium ions, dysprosium ions, and/or thulium ions, and/or at least one transition metal ion). In some embodiments, core 110 is formed of fused silica doped with ytterbium ions.

Core 110 can optionally include certain other materials. For example, core 110 can include one or more materials to increase its index of refraction (e.g., germanium oxide) or to decrease its index of refraction (e.g., boron oxide). As another example, core 110 can include one or more materials (e.g., aluminum oxide) that can enhance the solubility of the rare earth ion(s) within core 110 (e.g., within silica, such as fused silica). As a further example, core 110 can include one or more materials (e.g., phosphorus pentoxide) that enhance the homogeneity of the index of refraction within core 110. Combinations of such materials can be used. In certain embodiments, core 110 can contain fluorine. Without wishing to be bound by theory, it is believed that fluorine present in core 110 can affect the viscosity of core 110 (e.g., at elevated temperature). It is believed that fluorine in core 110 can result in core 110 having enhanced homogeneity.

In general, cladding 120 is used to substantially confine the pump energy at wavelength $\lambda_p$ so that the pump energy propagates along fiber 100 and can interact with core 110. Cladding 120 is typically formed from a material having a lower refractive index than core 110. In some embodiments, core 110 has a refractive index ($n_{110}$) and cladding 120 has a refractive index ($n_{120}$) so that $((n_{110})^2-(n_{120})^2)^{1/2}$ is less than about 0.2 (e.g., less than about 0.17) and greater than about 0.05 (e.g., greater than about 0.12), such as about from 0.12 to 0.17. Examples of materials from which cladding 120 can be formed include silica materials, such as fused silica materials.

Cladding 120 has a substantially square cross-section, including four substantially flat (e.g., optically flat) sides 160a, 160b, 160c, and 160d. The angle subtended by adjacent sides 160a and 160b, 160b and 160c, 160c and 160d, and 160d and 160a is approximately 90°. Adjacent sides 160a and 160b meet at vertex 150a, adjacent sides 160b and 160c meet at vertex 150b, adjacent sides 160c and 160d meet at vertex 150c, and adjacent sides 160d and 160a meet at vertex 150d. Vertices 150a, 150b, 150c, and 150d are fused to layer 140.

Inner surface 170 of layer 140 partially defines regions 130a, 130b, 130c, and 130d, and can serve as a protective layer for cladding 120. Layer 140 can also provide an outermost surface of fiber 100 for the subsequent coating of additional layers (e.g., layers providing mechanical strength, chemical protection and/or physical protection). Generally, the refractive index of layer 140 can vary as desired (e.g., the refractive index of layer 140 can be about the same as the refractive index of cladding 120, the refractive index of layer 140 can be greater than the refractive index of cladding 120, the refractive index of layer 140 can be less than the refractive index of cladding 120). Examples of materials from which layer 140 can be formed include silica materials, such as fused silica materials. Materials from which layer 140 can be formed can be, for example, fluorinated or nonfluorinated.

Regions 130a, 130b, 130c, and 130d provide an optical interface at cladding sides 160a, 160b, 160c and 160d so that, when regions 130a-130d have a lower index of refraction than cladding 120, regions 130a-130d can substantially confine pump energy inside cladding 120. In some embodiments, regions 130a –130d are substantially evacuated. In certain embodiments, regions 130a–130d contain a gas (e.g., air, nitrogen, argon), a liquid (e.g., one or more low refractive index oils) and/or a solid (e.g., one or more polymers). The refractive index of each region may be the same as or different than each other region.

In some embodiments, the maximum dimension of one or more of regions 130a–130d between cladding 120 and inner surface 170, is about the same as or greater than the wavelength of the pump energy ($\lambda_p$) (e.g., about the same as the wavelength of the pump energy, at least about twice the wavelength of the pump energy, at least about three times the wavelength of the pump energy, at least about four times the wavelength of the pump energy, at least about five times the wavelength of the pump energy, at least about six times the wavelength of the pump energy, at least about seven times the wavelength of the pump energy, at least about eight times the wavelength of the pump energy, at least about nine times the wavelength of the pump energy, at least about 10 times the wavelength of the pump energy, at least about 20 times the wavelength of the pump energy, at least about 50 times the wavelength of the pump energy, at least about 75 times the wavelength of the pump energy, at least about 100 times the wavelength of the pump energy).

In certain embodiments, the maximum dimension of one or more of regions 130a–130d between cladding 120 and inner surface 170, is at least 0.8 micron (e.g., at least about one micron, at least two microns, at least three microns, at least about four microns, at least about five microns, at least about six microns, at least about seven microns, at least about eight microns, at least about nine microns, at least about 10 microns, at least about 20 microns, at least about 35 microns, at least about 50 microns, at least about 60 microns, at least about 75 microns).

In certain embodiments, regions 130a, 130b, 130c, and 130d are of sufficient dimension such that substantially no energy propagating in cladding 120 that is incident on sides 160a, 160b, 160c, or 160d is coupled into layer 140.

In some embodiments, pump energy can be efficiently coupled into cladding 120 (e.g., by end-coupling). The numerical aperture of a fiber describes the pump energy gathering efficiency of a fiber, and for fiber 100 the numerical aperture (NA) is given approximately by:

$$NA = \sqrt{(n_{120}^2 - n_{130}^2)},$$

where $n_{120}$ is the index of refraction of cladding 120 and $n_{130}$ is the effective index of regions 130a, 130b, 130c and 130d surrounding cladding 120. In some embodiments, fiber 100 can have a high numerical aperture (e.g., at least about 0.25, at least about 0.3, at least about 0.35, at least about 0.4, at least about 0.5, at least about 0.6, at least about 0.7, at least about 0.8, at least about 0.9, about one).

Figure 2:
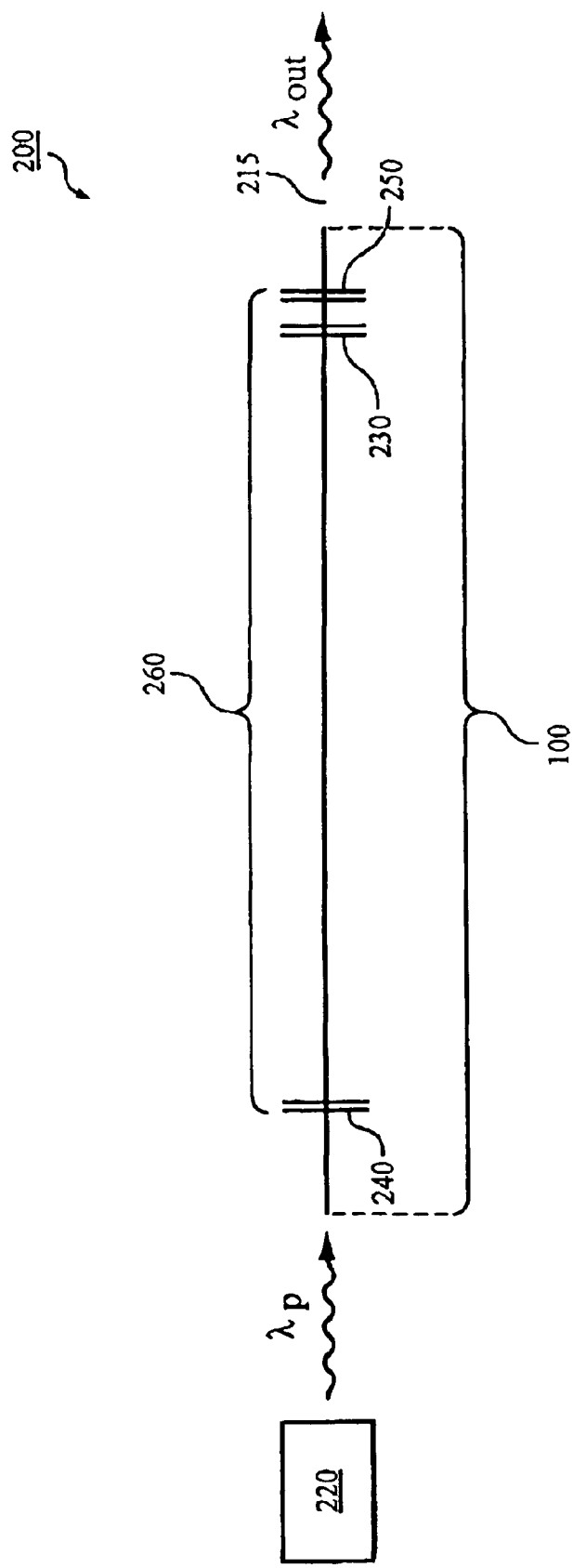
FIG. 2 is a schematic representation of an embodiment of a fiber laser system.

FIG. 2 shows a fiber laser system 200 including fiber 100 and a pump source 220 (e.g., a laser, such as a semiconductor diode laser). Pump source 220 emits energy at wavelength $\lambda_p$ and is configured so that this energy can be coupled into fiber 100 (e.g., by end-pumping or side-pumping). In addition to core 110, cladding 120, regions 130a–130d, and layer 140, fiber 100 includes reflectors 230, 240 and 250 (e.g., Bragg gratings). Reflector 230 is configured to reflect substantially all (e.g., about 100%) of the energy impinging thereon at wavelength $\lambda_p$. Reflector 240 is configured to reflect substantially all (e.g., about 100%) energy impinging thereon at wavelength $\lambda_{out}$ and reflector 250 is configured to reflect a portion (e.g., at least 98%, at least 95%, at least 90%, at least 80%, at least 70%, at least 60%, at least 50%, at least 40%, at least 30%, at least 20%, at least 10%, at least 5%) of the energy impinging thereon at wavelength $\lambda_{out}$ so that reflectors 240 and 250 form a resonance cavity 260 for energy at wavelength $\lambda_{out}$.

During operation of system 200, pump energy at wavelength $\lambda_p$ is emitted by source 220, coupled into fiber 100 and propagates in fiber 100. As the pump energy propagates along fiber 100, it is substantially confined within the volume of fiber 100 defined by cladding 120. A portion of the pump energy within cladding 120 intersects core 110, and a portion of the pump energy intersecting core 110 interacts with the active material in core 110 to form energy at wavelength $\lambda_{out}$ (e.g., via electronic transitions in the active material contained in core 110, such as three-level lasing or four-level lasing).

$\lambda_{out}$ is generally different from $\lambda_p$ Examples of $\lambda_{out}$ include about 1080 nanometers and about 1100 nanometers. Examples of $\lambda_p$ include about 915 nanometers and about 975 nanometers.

Energy having wavelength $\lambda_{out}$ that is formed in cavity 260 may experience gain (e.g., by stimulated emission) and grow in intensity. A portion of the energy at wavelength $\lambda_{out}$ propagating in cavity 260 exits cavity 260 through reflector 250 and ultimately exits fiber laser 100 through end 215.

Figure 3A:
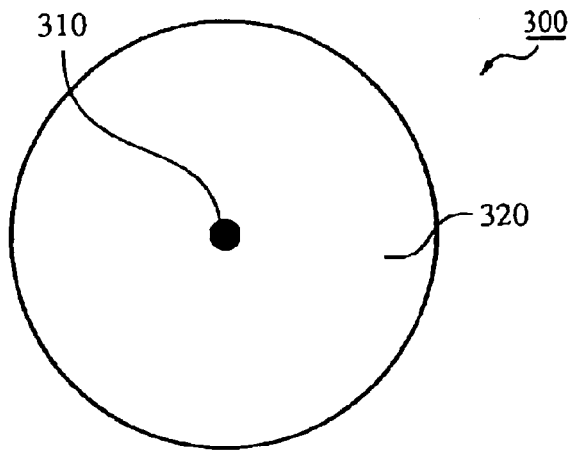
Figure 3B:
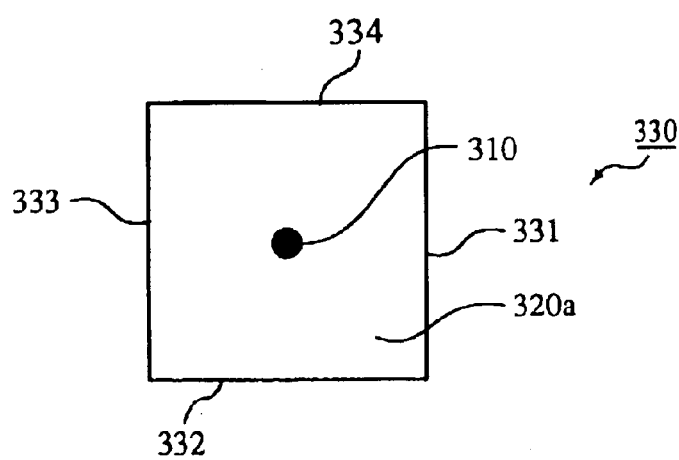
Figure 3C:
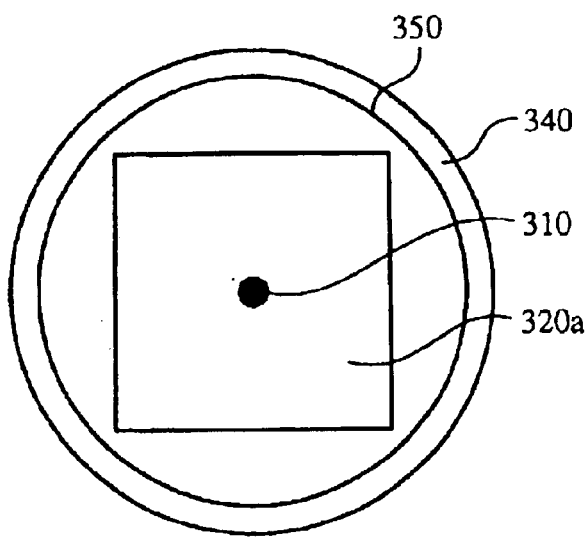

FIGS. 3A–3D show a method of making optical fiber 100. Referring to FIG. 3A, a preform 300 having a cylindrical cross-section with a core 310 and a cladding 320 (having a cylindrical cross-section) is prepared using, for example, modified chemical vapor deposition (MCVD). The outer surface of cladding 320 is ground and polished to yield a preform 330 having a square cross-section with core 310 and cladding 320a (FIG. 3B). Cladding 320a has a square cross-section defined by sides 331, 332, 333 and 334. Preform 330 is then inserted into layer 340 having an inner surface 350 (FIG. 3C). Layer 340 is cylindrical in shape and can be formed from the same material as cladding 320. As shown in FIG. 3D, the air remaining between inner surface 350 and preform 330 is removed to ensure that the vertices 371, 372, 373 and 374 of cladding 320a contract inner surface 350. Layer 340 and square preform 330 are then heated to fuse vertices 371, 372, 373 and 374 with inner wall 350, forming a final preform 380 with regions 361, 362, 363, and 364 between layer 340 and cladding 320a (FIG. 3D). Fiber 100 is then drawn from the final preform 380 (e.g., using a draw tower).

While FIGS. 3A–3D show a method of making an optical fiber preform, the invention is not so limited. Other methods can also be used. For example, in some embodiments a preform having a core and a cladding is formed, followed by boring holes into the preform (e.g., using a sonic drill) that run parallel to the preform axis. The optical fiber can then be drawn from the final preform.

While particular embodiments of optical fibers have been described, the invention is not limited to such embodiments. For example, while the core has been shown as being located substantially at the center of the cladding and the exterior layer, the core can be substantially eccentrically disposed with respect to the center of the cladding and/or with respect to the center of the inner surface of the exterior layer.

Moreover, in general, the cross-sectional shape of the cladding may be any two dimensional shape. For example, the cladding may be in the shape of any polygon. In some embodiments, the cladding may be in the shape of any four-sided polygon (e.g., a square, a rectangle, a parallelogram, a trapezoid etc.). As another example, the cladding may have fewer than four sides (e.g., three sides). As a further example, the cladding may have more than four sides (e.g., five sides, six sides, seven sides, eight sides, nine sides, 10 sides, etc.).

Furthermore, the sides of the cladding can be of substantially equal length, or different in length. In some embodiments, a plurality of sides of the cladding may be substantially equal in length, but may differ in length from other sides of the cladding.

In addition, the angles subtended by adjacent sides of the cladding may be substantially equal, or they can be different. In some embodiments, a plurality of the angles subtended by adjacent sides of the cladding may be substantially equal, but may differ from other angles subtended by adjacent sides of the cladding.

In some embodiments, the cross-section of the cladding may be in the shape of a convex polygon chosen so that the pump energy propagating within the optical fiber forms a substantially uniform radiation field. In certain embodiments, the shape of the cladding can be chosen such that substantially all possible modes of pump energy propagating in the optical fiber can intersect the core at least at one point in the fiber (e.g., modes, such as helical modes, that do not intersect the core are substantially unable to propagate along the cladding).

In general, the cladding can occupy any percentage of the area inside the inner surface of the exterior layer (e.g., inner surface 170 of layer 140) (e.g., at least about one percent, at least about two percent, at least about five percent, at least about 10 percent, at least about 20 percent, at least about 30 percent, at least about 40 percent, at least about 50 percent, at least about 60 percent, at least about 70 percent, at least about 80 percent, at least about 90 percent). In certain embodiments (e.g., for three-level lasing), the cladding occupies from about five percent to about 15 percent of the area inside the inner surface of the exterior layer (e.g., inner surface 170 of layer 140). In some embodiments, (e.g., for four-level lasing), the cladding occupies from about 75 percent to about 90 percent of the area inside the inner surface of the exterior layer (e.g., inner surface 170 of layer 140).

Figure 4C:
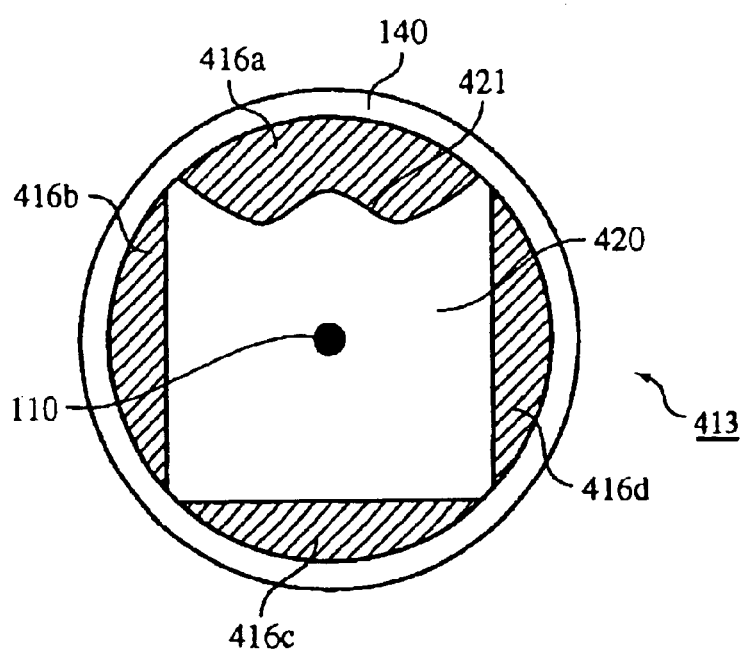

In general, the sides of the cladding can be straight or curved (e.g., convex or concave). In some embodiments, one or more sides of a cladding may have portions that are straight, convex and/or concave. FIGS. 4A–4C show examples of shapes that the sides of fiber claddings may have. FIG. 4A shows an optical fiber 414 having core 110, a cladding 401 and layer 140. Cladding 401 has a substantially flat side 403 and a convex side 402. Cladding 401 and layer 140 define a region 404 (e.g., a D-shaped region). FIG. 4B shows an optical fiber 412 having core 110, a cladding 410 and layer 140. Cladding 410 has four sides, including a concave side 411. Cladding 410 and layer 140 define regions 415a, 415b, 415c and 415d. FIG. 4C shows an optical fiber 413 having core 110, a cladding 420 and layer 140. Cladding 420 has four sides, including a curved side 421 having portions that are convex and other portions that are concave. Cladding 420 and layer 140 define regions 416a, 416b, 416c and 416d. In some embodiments, cladding 401, 410 and/or 420 can be formed of the same material as layer 140 (e.g., a silica material, such as fused silica).

Figure 4D:
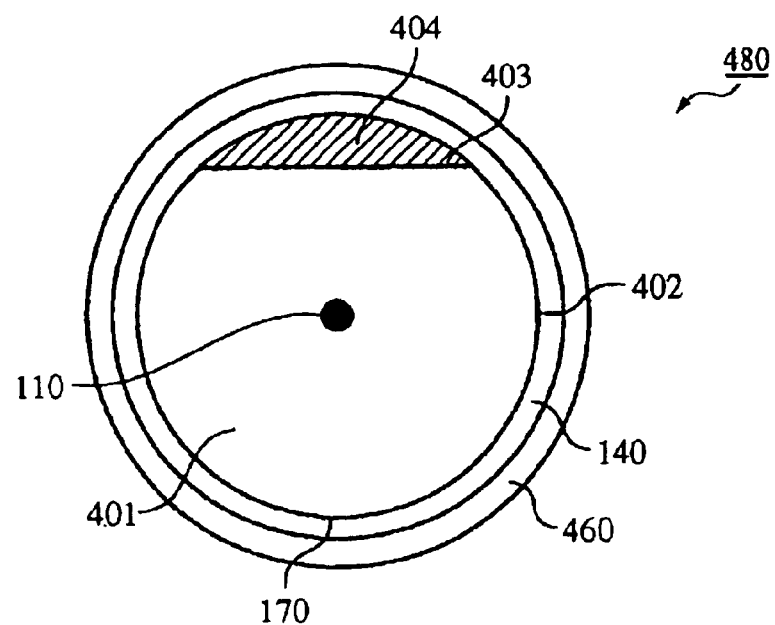

FIG. 4D shows an embodiment of an optical fiber 480 having core 110, cladding 401, layer 140, region 404 and a layer 460. Layer 460 can have any refractive index. For example, the refractive index of layer 460 can be substantially equal to the refractive index of layer 140. Alternatively, the refractive index of layer 460 can be less than the refractive index of layer 140. In some embodiments, the refractive index of layer 460 is less than the refractive index of layer 140. In optical fiber 480, the refractive index of layer 140 can be substantially equal to the refractive index of cladding 401.

Layer 460 can be formed from, for example, silica and silica-containing materials (e.g., fused silica). In some embodiments, layer 460 can be formed from polymeric materials, for example, polymeric materials having a low refractive index (e.g., less than 1.50, less than 1.45, less than 1.40, from about 1.35 to about 1.38). Fluorinated, low index polymeric materials can be used in certain embodiments.

In some embodiments, a precursor to layer 460 can be included in the final preform from which fiber 480 is made. In alternative embodiments, layer 460 can be coated onto fiber 480, at any time during or after fiber 480 is being made.

Figure 5:
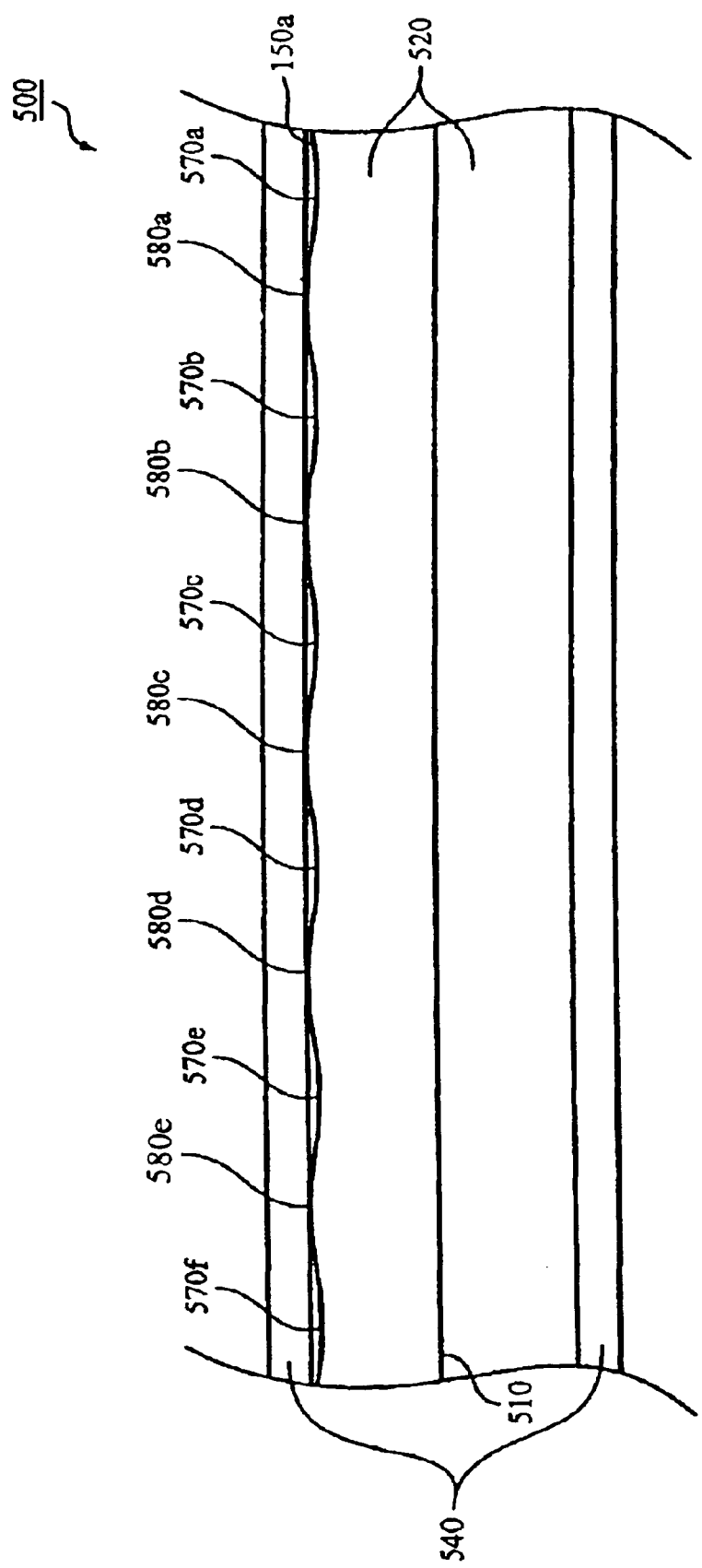
FIG. 5 is a cross-sectional view of an embodiment of an optical fiber.

In general, the cladding contained in an optical fiber may be fused to the inner surface of the layer (e.g., surface 170 of layer 140) along the entire length of the cladding, or along one or more portions of the length of the cladding. FIG. 5 shows a partial cross-sectional view of an embodiment of an optical fiber 500 having a core 510, an exterior layer 540 and a cladding 520 that contacts layer 540 at points 580a, 580b, 580c, 580d, and 580e without contacting layer 540 at points 570a, 570b, 570c, 570d, 570e, 570f. In some embodiments, layer 540 and cladding 520 are fused at one or more of points 580a, 580b, 580c and/or 580d. In certain embodiments, layer 540 and cladding 520 are not fused at points 580a, 580b, 580c and 580d.

While regions have been described as having substantially D-shaped cross-sections, other cross-sections can be used. Generally, the regions can be any shape. In some embodiments, the regions may be substantially regularly shaped (e.g., oval, round, square, triangular, trapezoidal, etc.). In certain embodiments, the regions can be irregularly shaped. Different regions can have different cross-sectional shapes. For example, one region can be substantially D-shaped, while other regions are triangular. Combinations of different shapes can be used.

In some embodiments, one or more regions 130a–130d may be substantially continuous along the length of the optical fiber. In certain embodiments, one or more regions 130a–130d may be discontinuous along the length of the optical fiber. In some embodiments, adjacent regions may be at least partially continuous with adjacent regions (e.g., at points 570a, 570b, 570c, 570d, 570e, and 570f).

Figure 6:
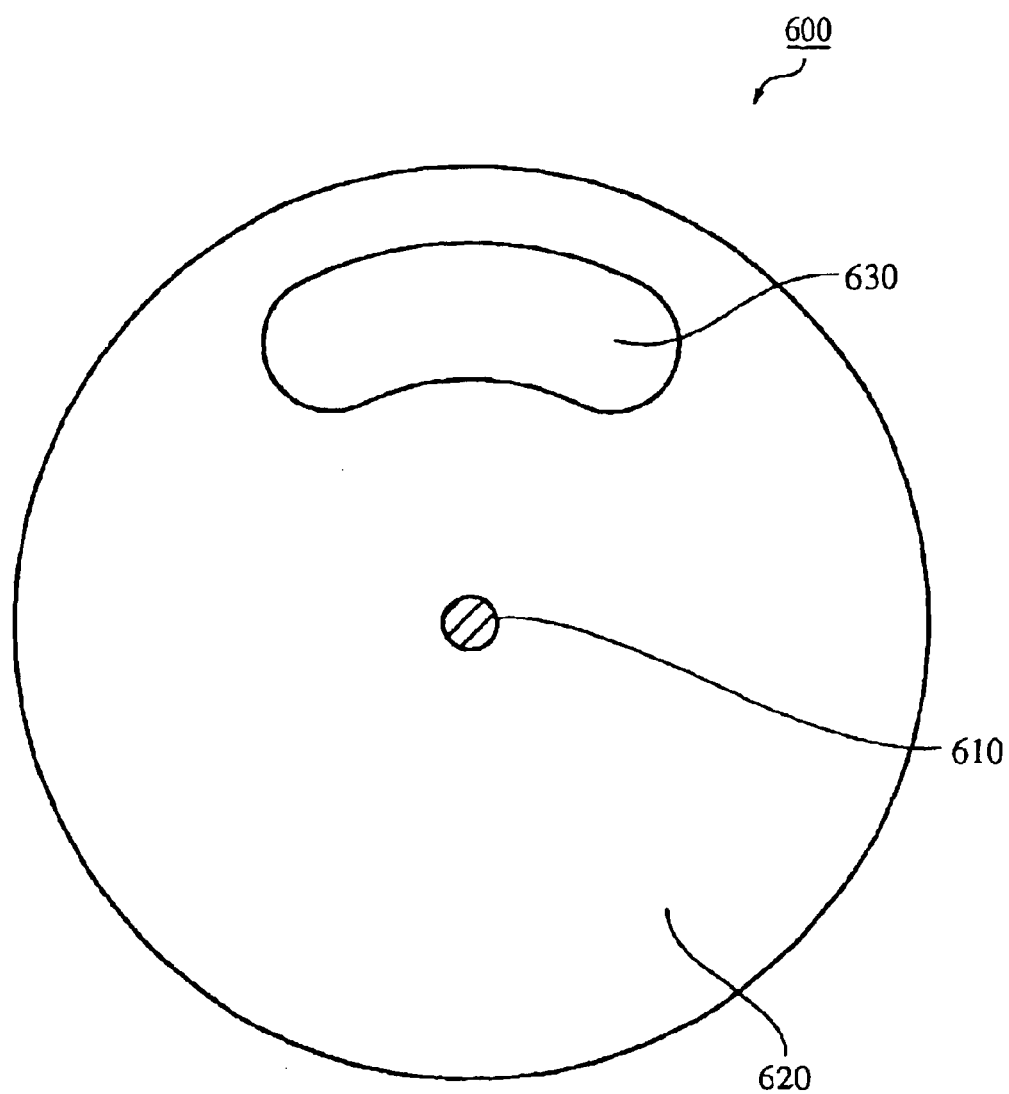
FIG. 6 is a cross-sectional view of an embodiment of an optical fiber.

FIG. 6 shows a cross-sectional view of an optical fiber 600. Fiber 600 has core 610 and a cladding 620. Cladding includes a region 630 having a different refractive index than cladding 620 (e.g., region 630 has a higher index of refraction than cladding 620 or region 630 has a lower index of refraction than cladding 620). Region 630 can be any two-dimensional shape (e.g., round, oval, irregularly shaped, polygonal, etc.). Although shown in FIG. 6 as having only one region 630, cladding 620 can contain multiple regions 630 (e.g., two regions, three regions, four regions, five regions, six regions, etc.). The region(s) can be continuous or discontinuous along the length of the optical fiber. Moreover, although not shown in FIG. 6, fiber 600 can include a layer disposed on the exterior surface of cladding 620 (e.g., a layer having a higher index of refraction than cladding 620, a layer having a lower index of refraction than layer 620, or a layer having substantially the same index of refraction as cladding 620). In some embodiments, a layer disposed on the exterior surface of cladding 620 can absorb a substantial amount of energy at the wavelength $\lambda_p$ (e.g., a layer disposed on the exterior surface of cladding 620 can be substantially opaque to energy at wavelength $\lambda_p$). The ratio of the area of region 630 to the area of cladding 620 can be any value (e.g., at least about one percent, at least about five percent, at least about 10 percent, at least about 20 percent, at least about 30 percent, at least about 40 percent, at least about 50 percent, ay least about 60 percent, at least about 70 percent, at least about 80 percent, at least about 90 percent).

Figure 7:
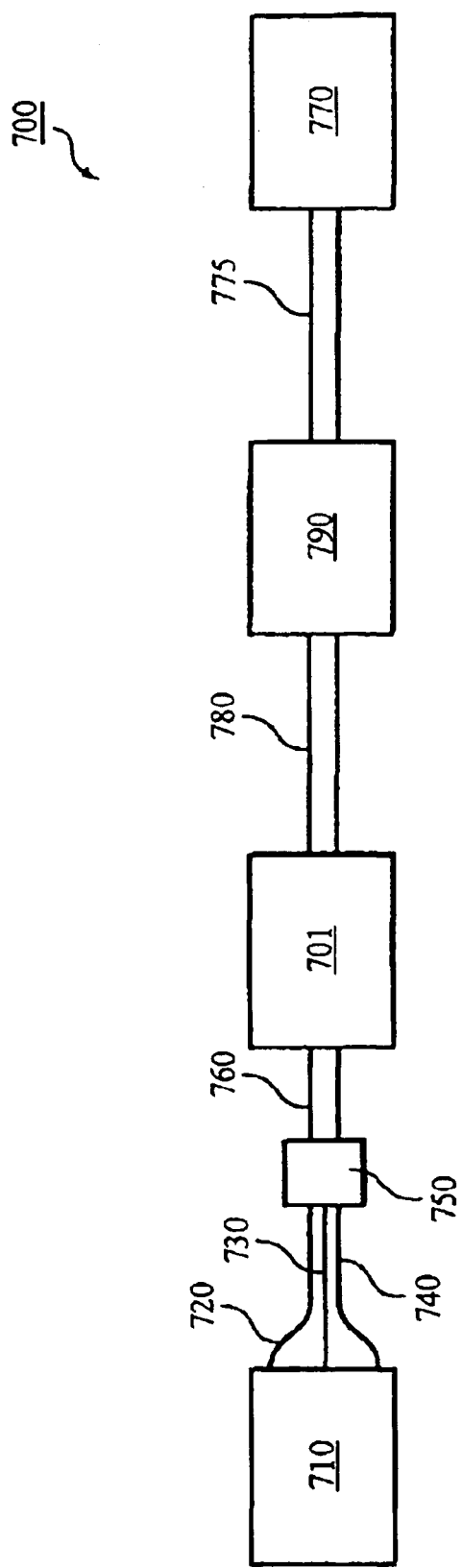
FIG. 7 is schematic representation of a fiber laser system.

FIG. 7 shows a system 700 including an energy source 710 (e.g., a laser, such as a semiconductor diode laser) a fiber 701 (e.g., a fiber laser formed of an optical fiber and including reflectors as described herein), a Raman fiber laser 790 and an output cascade 770. Energy source 710 is connected to a combiner 750 via fibers 720, 730 and 740. Combiner 750 is connected to fiber 701 via a coupler 760. Fiber 701 is in turn connected to a Raman fiber laser 790 via a coupler 780, and Raman fiber laser 790 is connected to an output cascade 770 via a fiber coupler 775. In certain embodiments, laser 790 and output cascade 770 are integrated into a single unit.

During operation, energy at wavelength $\lambda_p$ is generated by source 710, propagates along fibers 720, 730 and 740, and is coupled into fiber 701 via combiner 750 and coupler 760. A portion of the energy at $\lambda_p$ is converted by fiber 701 into energy at wavelength $\lambda_{out}$. Energy at $\lambda_{out}$ exits fiber 701, propagates along coupler 780 and is coupled into Raman fiber laser 790. Some of the energy at wavelength $\lambda_{out}$ entering Raman fiber laser 790 is converted to energy at one or more longer wavelengths. The energy at the longer wavelength(s) is coupled into output cascade 770 by coupler 775. Cascade 770 optionally includes variable output couplers that can be dynamically adjusted to modulate the amount of energy allowed to exit system 700 at desired wavelengths.

While certain embodiments have been described, the invention is not limited to these embodiments. For example, in certain embodiments, an optical fiber can include a core (e.g., a single mode core) that does not contain an active material. As another example, an optical fiber may contain more than one lasing cavity. As a further example, the refractive index of a region (e.g., one or more of regions 130*a*–130*d*) can be equal to or less than the refractive index of the cladding.

Moreover, in certain embodiments, the optical fiber is substantially devoid of a support structure (e.g., a silica material, such as a silica web) between the portions of the optical fiber that define a region having a lower refractive index than the cladding. As an example, regions 130*a*, 130*b*, 130*c* and/or 130*d* can be substantially devoid of a support structure (e.g., a silica material, such as a silica web). As another example, region 630 can be substantially devoid of a support structure (e.g., a silica material, such as a silica web).

Other embodiments are in the claims.

What is claimed is:

1. An optical fiber comprising:

a core having an index of refraction;

a cladding surrounding said core and having a first index of refraction that is less than said index of refraction;

a layer surrounding said cladding;

said cladding including first and second adjacent sides forming a vertex that is fused to said layer; and wherein said first side of said cladding partially defines a first region that is between the cladding and the layer and the second side of said cladding partially defines a different region that is between said cladding and said layer, each of said regions comprising an index of refraction that is different than said first index of refraction.

2. The optical fiber of claim 1 wherein at least one of said regions has a D-shaped cross section.

3. The optical fiber of claim 1 wherein at least one of said regions comprises a void.

4. The optical fiber of claim 3 wherein said void is evacuated.

5. The optical fiber of claim 3 wherein said void contains a gas.

6. The optical fiber of claim 1 wherein at least one of said regions contains a solid material.

7. The optical fiber of claim 1 wherein at least one of said sides includes a portion that is curved.

8. The optical fiber of claim 1 wherein said core comprises rare earth ions.

9. The optical fiber of claim 8 wherein said rare earth ions include ytterbium ions.

10. The optical fiber of claim 1 wherein said cladding comprises a substantially square cross section.

11. The optical fiber of claim 1 wherein said cladding comprises a cross section in the shape of a convex polygon.

12. The optical fiber of claim 1 wherein said layer comprises a glass and comprises a second index of refraction that is less than said first index of refraction.

13. The optical fiber of claim 1 wherein said layer has an inner surface having a circular cross section.

14. The optical fiber of claim 13 wherein said layer has an inner surface, and wherein said cladding occupies at least about 60% of the area inside said inner surface of said layer.

15. The optical fiber of claim 1 wherein said layer has an inner surface, and wherein said cladding occupies at least about 60% of the area inside said inner surface of said layer.

* * * * *